United States Patent
Piringer

(10) Patent No.: US 7,384,263 B2
(45) Date of Patent: Jun. 10, 2008

(54) PROCESS FOR BURNING LUMPS OF MATERIAL WITH LEAN GAS

(75) Inventor: Hannes Piringer, Beinwil am See (CH)

(73) Assignee: Maerz-Ofenbau AG, Zurich (CH)

( * ) Notice: Subject to any disclaimer, the term of this patent is extended or adjusted under 35 U.S.C. 154(b) by 345 days.

(21) Appl. No.: 10/558,526

(22) PCT Filed: Mar. 22, 2004

(86) PCT No.: PCT/IB2004/000955

§ 371 (c)(1),
(2), (4) Date: Nov. 28, 2005

(87) PCT Pub. No.: WO2004/106828

PCT Pub. Date: Dec. 9, 2004

(65) Prior Publication Data

US 2006/0286494 A1   Dec. 21, 2006

(30) Foreign Application Priority Data

Jun. 3, 2003   (DE) ................................ 103 24 953

(51) Int. Cl.
*F27D 15/02* (2006.01)
(52) U.S. Cl. ........................................ 432/101; 432/96
(58) Field of Classification Search .................. 432/95, 432/96, 101, 58, 61, 99; 266/197; 110/347
See application file for complete search history.

(56) References Cited

U.S. PATENT DOCUMENTS

| | | | | |
|---|---|---|---|---|
| 4,205,459 A | * | 6/1980 | Koseki et al. | ................. 34/166 |
| 6,113,387 A | * | 9/2000 | Wilson et al. | ................. 432/99 |
| 6,453,831 B1 | * | 9/2002 | Zeisel | ........................ 110/347 |

FOREIGN PATENT DOCUMENTS

| | | |
|---|---|---|
| AT | 390 248 B | 4/1990 |
| DE | 44 46 007 A | 6/1996 |
| DE | 196 47 442 A | 5/1998 |

* cited by examiner

*Primary Examiner*—Gregory Wilson
(74) *Attorney, Agent, or Firm*—Ladas and Parry LLP

(57) ABSTRACT

A method for burning lumps of material, in particular limestone, is carried out in a regeneration shaft kiln (3) with at least two kiln shafts (1, 2) interconnected by an overflow line (19) and in which the material to be burned passes through an upper pre-heating zone (8), a central combustion zone (18) and a lower cooling zone (14). Combustion gas with a low calorific value of less than 7.5 megajoules (MJ) per $m^3$ is periodically and alternately supplied to each of the shafts (1, 2) through burner lances (9, 25) after being pre-heated by heat exchange with process gas of the combustion process. The combustion gas is pre-heated in a heat exchanger (21) and/or by means of a surface of the burner lances (9, 25) which extend through the pre-heating zone (8), said surface being enlarged to enhance heat exchange.

14 Claims, 1 Drawing Sheet

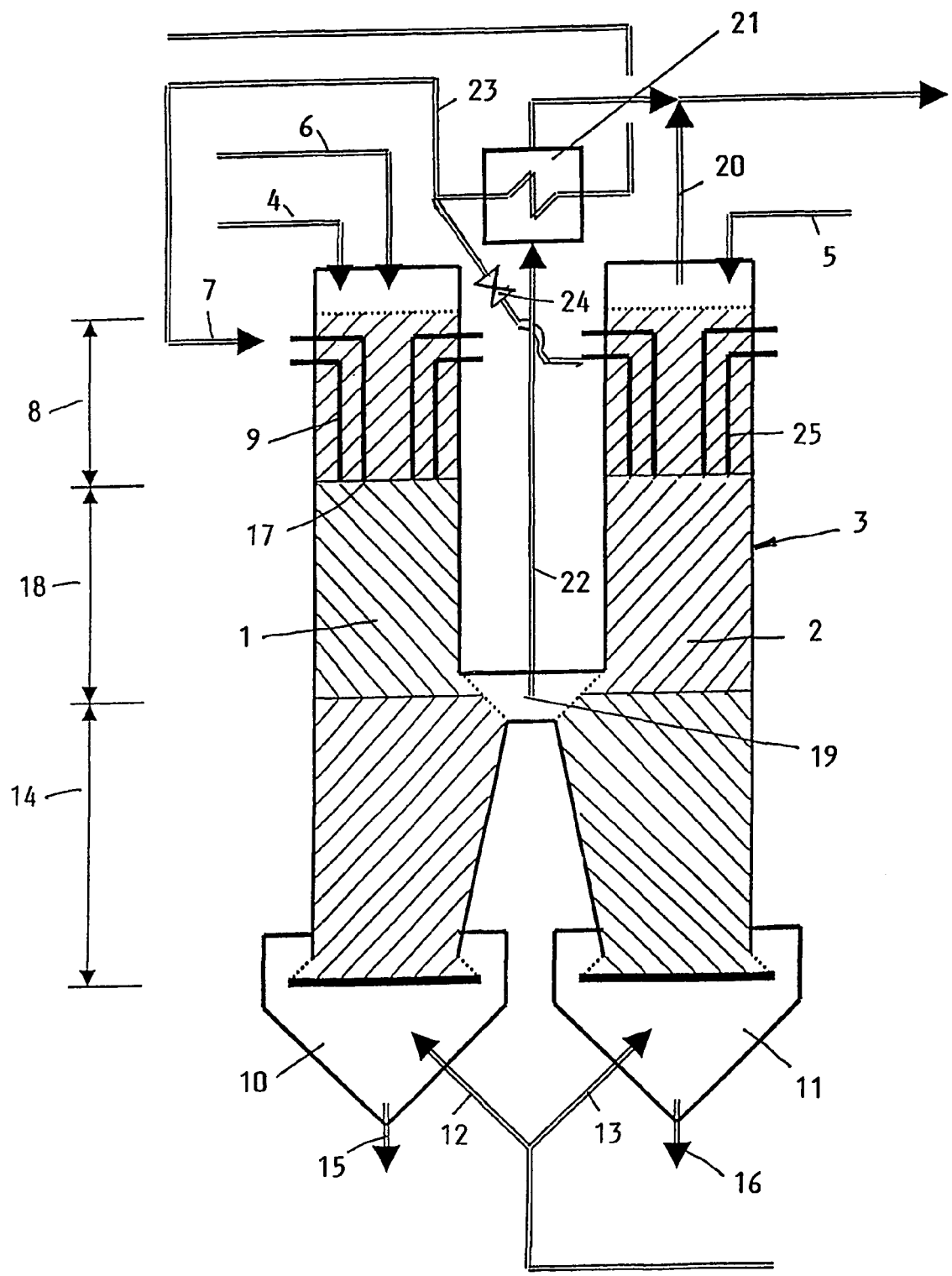

PROCESS FOR BURNING LUMPS OF MATERIAL WITH LEAN GAS

The invention relates to a method of burning lumps of material, in particular limestone, in a regenerative shaft kiln with at least two kiln shafts interconnected by an overflow line, in which shafts the combustion material passes through an upper pre-heating zone, a central burning zone and a lower cooling zone, wherein combustion air is supplied to the pre-heating zone, cooling air to the cooling zone and combustion gas, having a low calorific value of less than 7.5 Mega joules (MJ) per $m^3{}_n$ periodically and alternately to each of the shafts through burner lances.

Regenerative shaft kilns of this type, known as MAERZ kilns, distinguish themselves from shaft kilns of other types particularly being highly cost-effective. It has been established that the increased use of lean gas, i.e., a combustion gas with relatively low calorific value, such as, for example, the by-product in metallurgical works or biogas with a low calorific value of less than 7.5 Mega joules (MJ) per $m^3$, has an adverse effect on the process temperature of the regenerative shaft kiln, and reduces its degree of effectiveness due to the essentially higher flue gas volumes, and its lower temperature. Besides, higher flue gas temperatures require additional measures to prevent overheating of post-combustion filtering installations, through flue gas coolers or by mixing fresh air. On the other hand, the use of lean gas leads to better product quality by virtue of the decreased feed of sulphur.

The object of the invention is to find a method of the mentioned type that avoids the pointed out disadvantages and therefore, enables better product quality and good thermal efficiency T by using a combustion gas with a relatively low calorific value of less than 7.5 $MJ/m^3{}_n$.

In this invention, this objective is achieved by a method wherein the combustion gas is pre-heated in heat exchange with the process gas of the burning process. Advantageous embodiments of the method of invention are object of dependent claims, and can be taken from the following description and the drawing.

The lone FIGURE illustrates a schematic sectional representation of a regenerative kiln with two parallel shafts.

As already known, lumps of material with a particle size range of e.g. 40 to 80 mm are supplied to shafts 1 and 2 of kiln 3, as indicated by arrows 4 and 5. The supply of combustion air, also from the top as indicated by arrow 6 and of combustion gas as per arrow 7 with the help of the burner lances 9 arranged vertically in the pre-heating zone 8, takes place in intervals of e.g. 15 minutes to shaft 1 and shaft 2 alternately. Besides, cooling air is supplied continuously corresponding to arrows 12, 13 from the lower discharge area 10, 11 of the two shafts 1, 2 so that burned product after passing the cooling zone 14 can be withdrawn as cooled in the direction of arrows 15, 16. The flames created at the outlets 17 of the burner lances 9 receive pre-heated combustion air, because this air flows through lumps of material pre-heated during the previous operation period. The pre-heating of lumps of material in the pre-heating zone 8 takes place in the neighbouring shaft (2), because the burning gases flow into the neighbouring shaft 2 after passing through combustion zone 18 through an overflow line 19 and release it as flue gas in the upward direction of arrow 20.

According to the illustrated embodiment of the invention, the pre-heating of the burning gas takes place in a heat exchanger 21 with a hot gas flow branched off in relatively low volumes from the overflow line 19 through a pipe 22, which is afterwards directed to the flue gas flow indicated by arrow 20. When changing the process mode from shaft 1 to neighbouring shaft 2, pipe 23 guided through heat exchanger 21 can be switched by means of a valve 24 to burner lances 25 of shaft 2. Accordingly it is possible to operate a kiln 3 more economically with lean gas of low calorific value of less than 7.5 $MJ/m^3$ and e.g., of 4 $MJ/m^3$.

According to another embodiment of the invention, pre-heating of the burning gas can take place, alternately or additionally to pre-heating in the heat exchanger 21, in the preheated combustion air of the pre-heating zone, in that at least the outer surface of the burner lances 9, 25 is designed larger, e.g. by means of ribs.

The invention claimed is:

1. Method of burning lumps of material, in particular limestone, in a regenerative shaft kiln (3) with at least two kiln shafts (1,2) interconnected by an overflow line (19), in which shafts the material to be burned passes through an upper pre-heating zone (8), a central burning zone (18) and a lower cooling zone (14), whereby combustion air is supplied in the area of the pre-heating zone (8), cooling air is supplied to the cooling zone (14) and the supply of combustion gas having a low calorific value of less than 7.5 Mega joules (MJ) per $m^3$ alternates periodically to each of the shafts (1,2) through (9, 25), characterized in that that the combustion gas is pre-heated in heat exchange with process gas of the burning process.

2. Method according to claim 1, characterized in that the combustion gas in the preheating zone (8) is heated by the pre-heated combustion air therein.

3. Method according to claim 2, characterized in that the combustion gas is pre-heated while flowing through burner lances (9, 25) extending into the pre-heating zone (8), the surface of the lances being designed enlarged, at least on the outer side.

4. Method according to claim 3, characterized in that the combustion gas is pre-heated in heat exchange with a branched off part of the process gas branched off from the kiln (3), in that a heat exchanger (21) provided outside the kiln is connected on one side to a process gas pipe (22) coming from a branching position on the kiln and on the other side to a combustion gas pipe (23) leading to burner lances (9, 25).

5. Method according to claim 4, characterized in that it is operated with combustion gas the lower calorific value of which is less than 5 $MJ/m^3$.

6. Method according to claim 3, characterized in that it is operated with combustion gas the lower calorific value of which is less than 5 $MJ/m^3$.

7. Method according to claim 2, characterized in that the combustion gas is pre-heated in heat exchange with a branched off part of the process gas branched off from the kiln (3), in that a heat exchanger (21) provided outside the kiln is connected on one side to a process gas pipe (22) coming from a branching position on the kiln and on the other side to a combustion gas pipe (23) leading to burner lances (9, 25).

8. Method according to claim 7, characterized in that it is operated with combustion gas the lower calorific value of which is less than 5 $MJ/m^3$.

9. Method according to claim 2, characterized in that it is operated with combustion gas the lower calorific value of which is less than 5 $MJ/m^3$.

10. Method according to claim 1, characterized in that the combustion gas is pre-heated in heat exchange with a branched off part of the process gas branched off from the kiln (3), in that a heat exchanger (21) provided outside the kiln is connected on one side to a process gas pipe (22)

coming from a branching position on the kiln and on the other side to a combustion gas pipe (23) leading to burner lances (9, 25).

11. Method according to claim 10, characterized in that a part of the process gas for pre-heating the combustion gas is branched off from the overflow line (19) of the kiln.

12. Method according to claim 11, characterized in that it is operated with combustion gas the lower calorific value of which is less than 5 MJ/m$^3$.

13. Method according to claim 10, characterized in that it is operated with combustion gas the lower calorific value of which is less than 5 MJ/m$^3$.

14. Method according to claim 1, characterized in that it is operated with combustion gas the lower calorific value of which is less than 5 MJ/m$^3$.

* * * * *